United States Patent
Kusase et al.

[19]

[11] Patent Number: 6,147,432
[45] Date of Patent: Nov. 14, 2000

[54] AC GENERATOR STATOR FOR VEHICLE

[75] Inventors: Shin Kusase, Obu; Atsushi Umeda, Okazaki; Tsutomu Shiga, Nukata-gun, all of Japan

[73] Assignee: Denso Corporation, Kariya, Japan

[21] Appl. No.: 09/342,098

[22] Filed: Jun. 29, 1999

[30] Foreign Application Priority Data

Aug. 6, 1998 [JP] Japan .................................. 10-223382

[51] Int. Cl.⁷ .................................................. H02K 3/04
[52] U.S. Cl. ........................... 310/260; 310/45; 310/179; 310/194; 310/201; 310/254
[58] Field of Search ............... 310/260, 43, 45, 310/270, 271, 258, 179, 201, 195, 198, 208, 42, 194, 184, 254

[56] References Cited

U.S. PATENT DOCUMENTS

| | | | |
|---|---|---|---|
| 1,822,261 | 9/1931 | Apple | 310/168 |
| 2,928,963 | 3/1960 | Bertsche et al. | 310/168 |
| 3,151,260 | 9/1964 | MacCracken, Jr. et al. | 310/260 |
| 3,400,454 | 9/1968 | Balke et al. | 310/43 |
| 3,436,580 | 4/1969 | Brennen et al. | 310/260 |
| 4,197,476 | 4/1980 | Lund et al. | 310/260 |
| 4,335,179 | 6/1982 | Medelsohn et al. | 310/260 |
| 5,097,167 | 3/1992 | Kanayama et al. | 310/201 |

FOREIGN PATENT DOCUMENTS

| | | | |
|---|---|---|---|
| 3704780 A1 | 2/1987 | Germany | H02K 3/04 |
| 19529392 | 2/1997 | Germany | H02K 3/50 |
| 62-272836 | 11/1987 | Japan | H02K 3/04 |
| 63-274335 | 11/1988 | Japan | H02K 3/04 |
| 63-274335 | 11/1998 | Japan | H02K 3/50 |
| 92/06527 | 4/1992 | WIPO | H02K 3/12 |

*Primary Examiner*—Burton S. Mullins
*Attorney, Agent, or Firm*—Pillsbury Madison & Sutro LLP

[57] ABSTRACT

In an alternator for a vehicle, a stator winding is composed of a plurality of U-shaped conductor segments and an annular member. The conductor segments have connection edges connected to one another to form ring-connected coil-ends, and the annular member covers the ring-connected coil-ends at the connection edges and portions of the conductor segments adjacent the connection edges. The annular member has a prescribed thickness that provides the ring-connected coil-ends with a prescribed stiffness.

18 Claims, 7 Drawing Sheets

AC GENERATOR STATOR FOR VEHICLE

CROSS REFERENCE TO RELATED APPLICATION

The present application is based on and claims priority from Japanese Patent Application Hei 10-223382 filed on Aug. 6, 1998, the contents of which are incorporated herein by reference.

BACKGROUND OF THE INVENTION

1. Field of the Invention

The present invention relates to an AC generator for a vehicle such as a passenger car, trucks or the like.

2. Description of the Related Art

It is well known that a stator winding a vehicle AC generator is composed of a plurality of conductor segments as disclosed in JP-A-63-274335. Because the edge surface of coil-end portions and inclined intersecting portions of the conductor segments are covered with a thick and smooth insulation resin member except for straight portions extending from the stator core, it is difficult to cool the stator winding sufficiently. Because the straight portions are weaker in the circumferential stiffness than the intersecting portions, it is difficult to suppress vibration and the resultant noise.

SUMMARY OF THE INVENTION

A main object of the present invention is to provide an improved generator stator that is effective both in cooling the stator winding and in preventing vibration and the resultant noise.

According to a preferred embodiment of the invention, a stator comprises a stator core, a plurality of conductor segments composed of coil-end portions and in-slot portions forming a stator winding, and a ring-shaped resin member connecting the plurality of conductor segments. The plurality of conductor segments form inclined portions intersecting with one another and edge portions at said coil-end portions, and the resin member adheres to the edge portions in a circumferential direction thicker than the inclined portions.

According to a preferred embodiment of the invention, a stator winding of an alternator for a vehicle is composed of a plurality of U-shaped conductor segments and an annular member. The U-shaped conductor segment have connection edges connected to one another to form ring-connected coil-ends, and the annular member covers the ring-connected coil-ends at the connection edges and portions of the conductor segments adjacent the connection edges. The annular member has a prescribed thickness that provides the ring-connected coil-ends with a prescribed stiffness.

Preferably, the annular member is made of a thermosetting resinous material having a viscosity forming the prescribed thickness when coated on the ring-connected coil ends. Therefore, it is easy to provide the prescribed thickness.

Another object of the present invention is to provide an improved stator winding of an AC generator covered by an insulation member which is free from damage due to thermal expansion. For this object, ring-connected coil-ends may be impregnated with another thermosetting resinous material having a viscosity smaller than the first resinous material. The annular member may have a wave-shaped configuration corresponding to the outline of the ring-connected coil-ends. Accordingly, this structure protects the stator winding from water and prevents the connection edges from being oxidized and provides the prescribed stiffness as well as sufficient cooling spaces at the coil-ends. In addition, the annular member can have a uniform thickness so that cracks due to uneven thermal expansion can be prevented.

Preferably, the ring-connected coil-ends is composed of inner layer portions and outer layer portions intersecting with each other to form net-work structures, and the annular member covers portions of the ring-connected coil ends except the net-work structures. This feature provides as many cooling air passages in the ring-connected coil ends as desired.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

An AC generator for a vehicle according to an embodiment of the present invention is described in detail with reference to the appended drawings.

Figure 1:
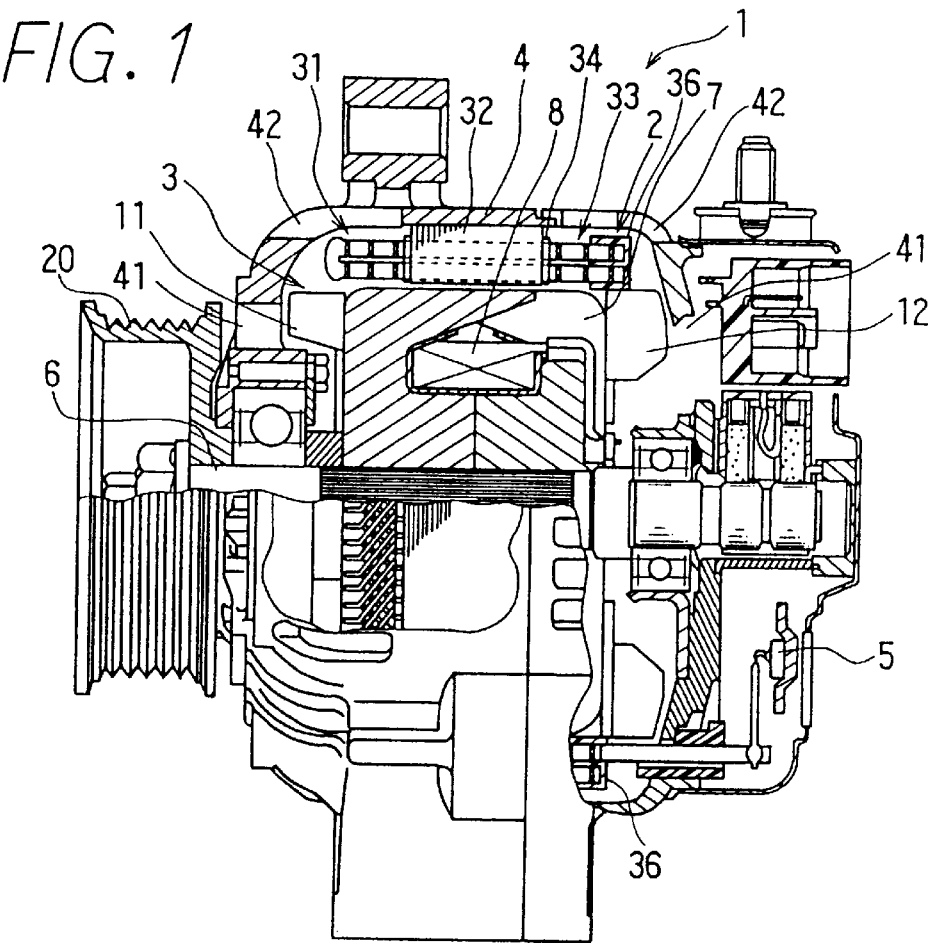
FIG. 1 is a cross-sectional side view of a main portion of an AC generator for a vehicle according to a preferred embodiment of the invention.

As shown in FIG. 1, an AC generator 1 for a vehicle according to a preferred embodiment of the present invention is composed of stator 2, rotor 3, frame 4, rectifiers 5 and others.

Stator 2 is composed of stator core 32, a stator winding having a plurality of conductor segments 33, insulators 34 disposed between conductor segments 33 and stator core 32, and resinous annular member 36 bonding edge portions 33f of coil ends 31 of the stator winding. Annular member 36 is formed from thermosetting epoxy powder as described later. Stator core 32 is composed of laminated thin steel-sheets and has a plurality of slots on the inner periphery thereof. Coil ends 31 is formed of conductor segments 33 extending from stator core 32.

Rotor 3 has pole core 7 with six claw poles, cylindrical field coils 8 housed inside claw poles, and shaft 6. Axial-flow type cooling fan 11 is fixed to the front side of the pole core 7 to supply cooling air from the front side of the pole core to the stator winding in axial and radial directions. Centrifugal type cooling fan 12 is also fixed to the rear side of the pole core 7 to supply cooling air from the rear side of pole core 7 to the stator winding in the radial direction.

Discharge vents 42 are provided at portions of frame 4 opposite coil ends 31, and intake vents 41 are provided at the front end of the frame 4.

Figure 2:
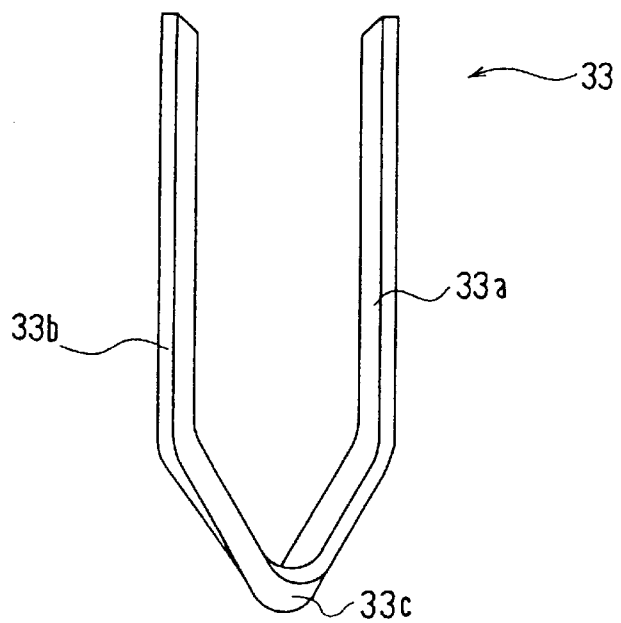
FIG. 2 is a perspective view of a conductor segment forming the stator winding.

As shown in FIG. 2, conductor segment 33 is a U-shaped member made of conductive material (e.g. copper). Conductor segment 33 has turn portions 33c, and an inner layer conductor portion 33a disposed in the radially inner layer of the slot and outer layer conductor portion 33b disposed in the radially outer layer of the slot. Each of inner and outer layer conductors 33a, 33b has an in-slot portion to be disposed in the slot and the outside conductor extending outside of the slot to form a portion of coil end 31.

Figure 3:
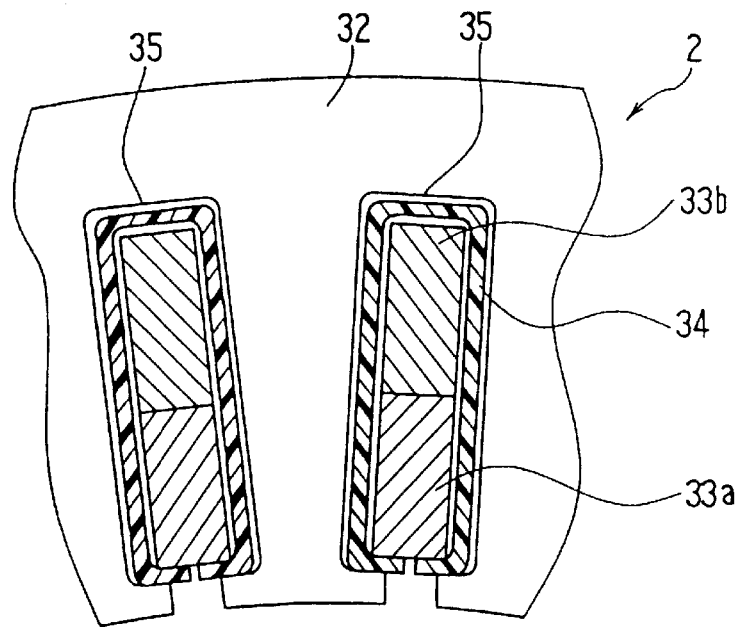
FIG. 3 is a fragmentary cross-sectional view of the stator.
Figure 6:
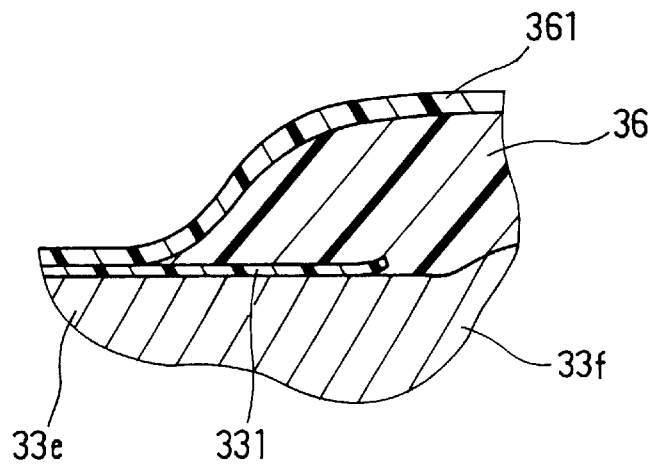
FIG. 6 is a fragmentary cross-sectional view of the connected portion.

As shown in FIG. 3, each of inner layer conductor 33a and outer layer conductor 33b has a rectangular cross-section having longer radial sides than circumferential sides. The conductor segments 33 are coated with insulation film 331 (as shown in FIG. 6). Conductor segments 33 are insulated from the inner walls of slot 35 by insulator 34.

Figure 4:
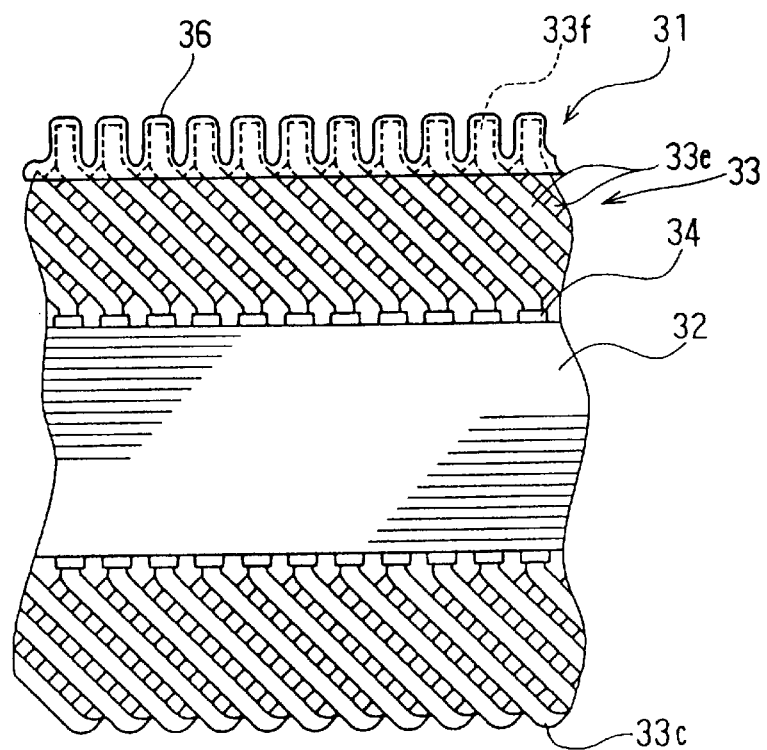
FIG. 4 is a fragmentary side view of the stator.

As shown in FIG. 4, conductor segments 33 are disposed in stator core 32 so that all turn portions 33c are disposed at one axial end of stator core 32 and all edge portions 33f are disposed at the other end thereof. Inclined portions 33e of coil ends 31 and inner layer conductors 33a are inclined to the direction opposite outer layer conductors 33b, so that inner layer conductor 33a and outer layer conductor 33b intersect with each other. Coil-end's edge portions 33f is connected with each other by an ultrasonic or arc welder, a brazing device, or the like.

Annular member 36 covers the surface area of edge portions 33f and limited portions of the inclined portion 33e adjacent edge portions 33f to bond or bridge edge portions 33, thereby providing coil ends 31 with enough stiffness against deformation and vibration.

Because annular member 36 covers portions adjacent inclined portions 33e, it provides sufficient cooling spaces of a net-work structure in coil ends 31, while it is tightly fixed to conductor segments 33 under vibrations and heat.

Figure 5:
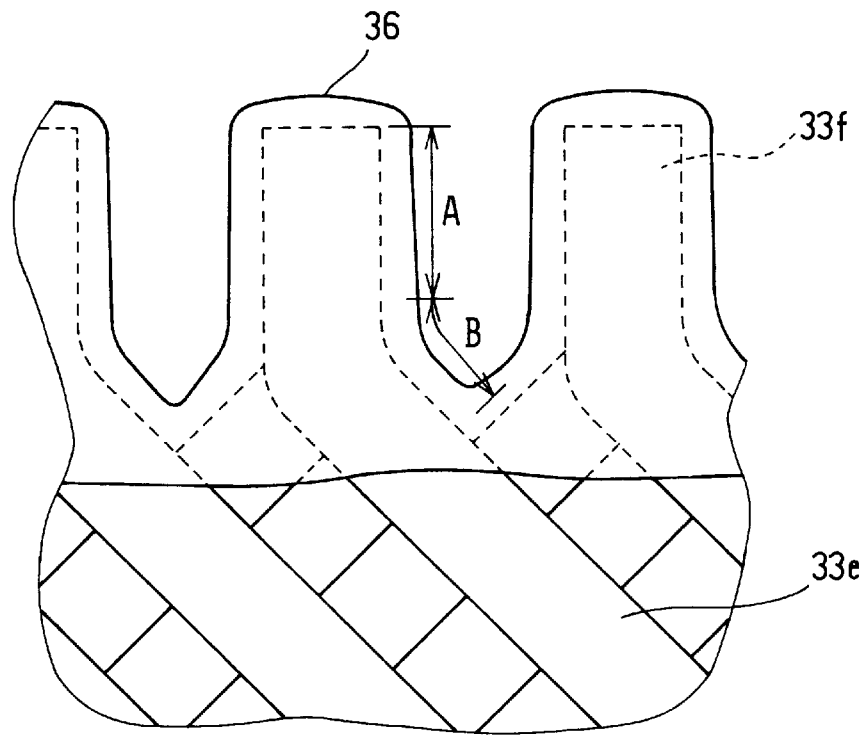
FIG. 5 illustrates connected portions of the conductor segments.

Annular member 36 also prevents edge portions 33f from being oxidized after they are welded as shown in FIG. 5. Otherwise, when the connected portions are welded together, connected portions A are melted, and the adjacent zones B are damaged or deteriorated with heat, and subjected to oxidization.

As shown in FIG. 6, thin layer 361 is formed on the surface of annular member 36 to cover all the inclined portions 33e and fill small gaps between annular layer 36 and conductor segments 33.

Figure 7:
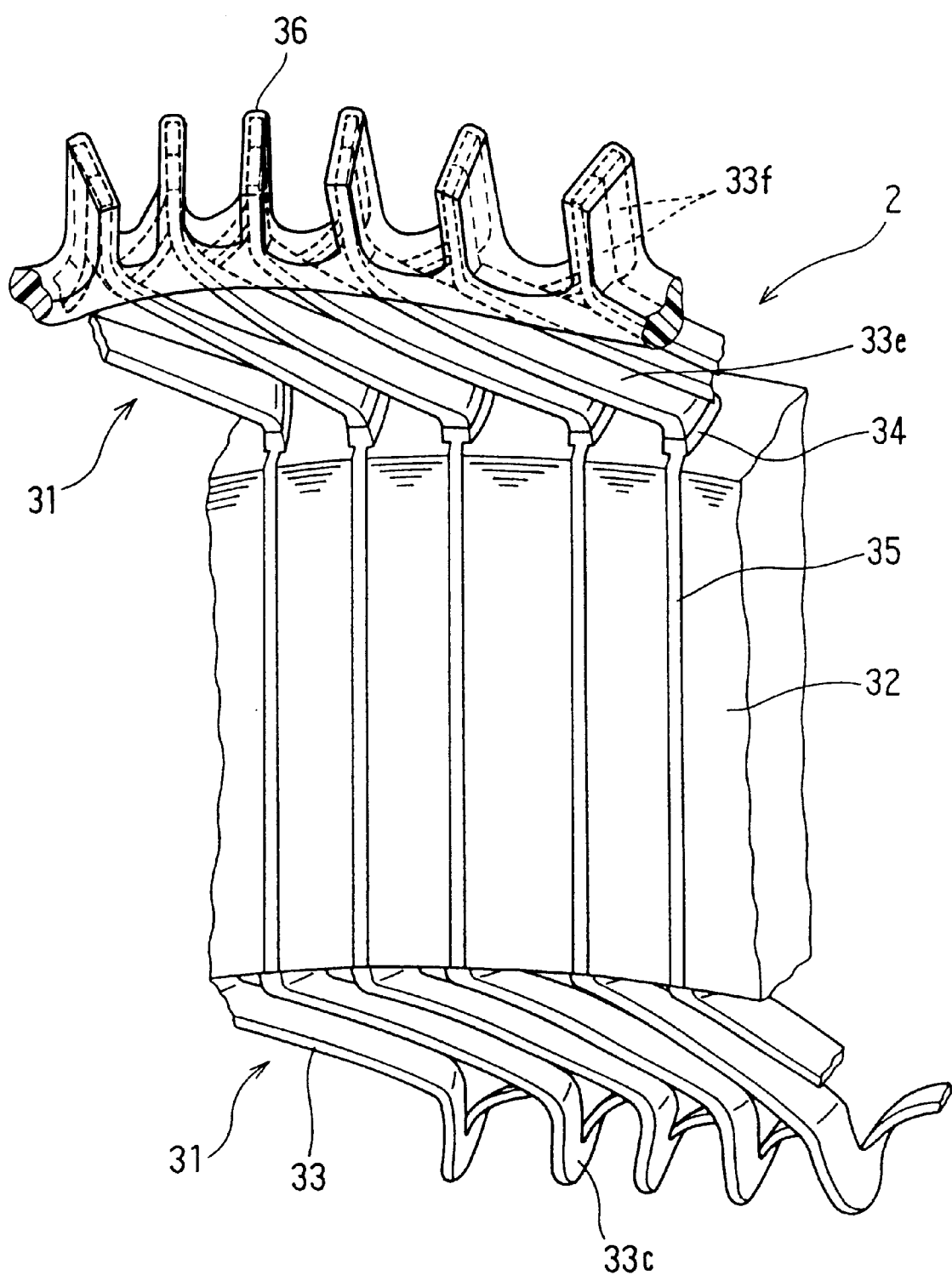
FIG. 7 is a fragmentary perspective view of coil ends at both ends of the stator

In manufacturing, insulators 34 are respectively inserted into the slots of the stator core 32, and conductor segments 33 are inserted into the slots inside insulators 34. As shown in FIG. 7, edge portions 33f are bent in the circumferential directions and connected as described before. Thereafter, thermosetting epoxy powder is applied to the portion indicated by A and B in FIG. 5, by way of fluidized-dipping, that include edge portions 33f and portions of inclined portions 33e, which are heated to form wavy annular member 36 as shown in FIG. 4. The wavy configuration of annular member 36 corresponds to the outline of the leading edge portions 33f. After that, the area of conductor segments 36 covered by the thermosetting resin powder is dipped in liquid resin and heated to form thin layer 361.

Since there is a difference in viscosity between the epoxy powder and epoxy liquid, coil ends 31 can be covered with comparatively a thick layer of the epoxy powder and sealed hermetically with epoxy liquid.

Figure 8:
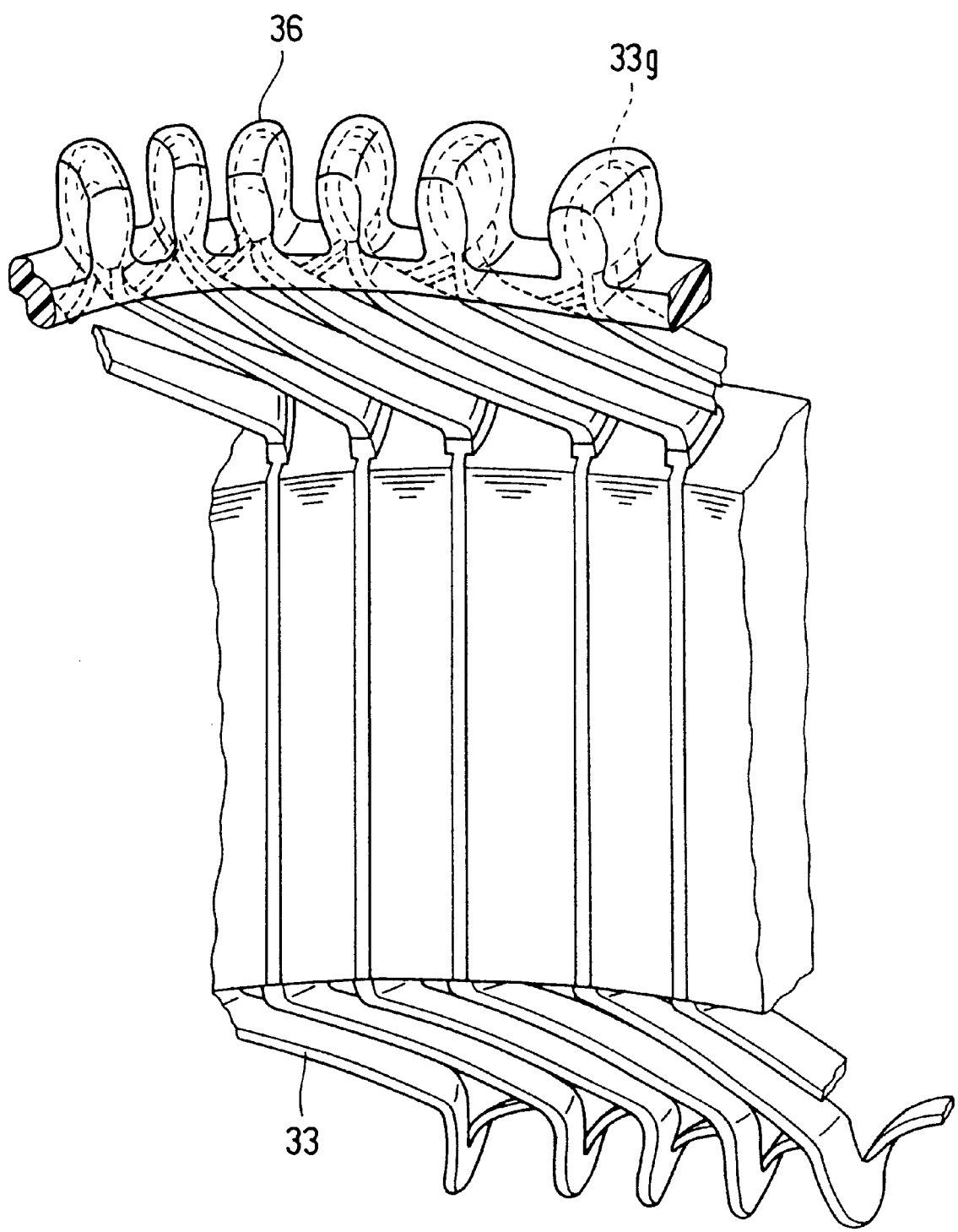
FIG. 8 is a fragmentary perspective view of a variation of the stator.

The connected portions of conductor segments 33 can be ball-shaped as shown in FIG. 8. This structure holds annular member 36 more tightly. This structure can be provided if edge portions 33f are welded by a TIG (tungsten inert-gas) welder.

It is important that the connected portions are larger in cross-section than that of conductor segments 36.

Figure 9:
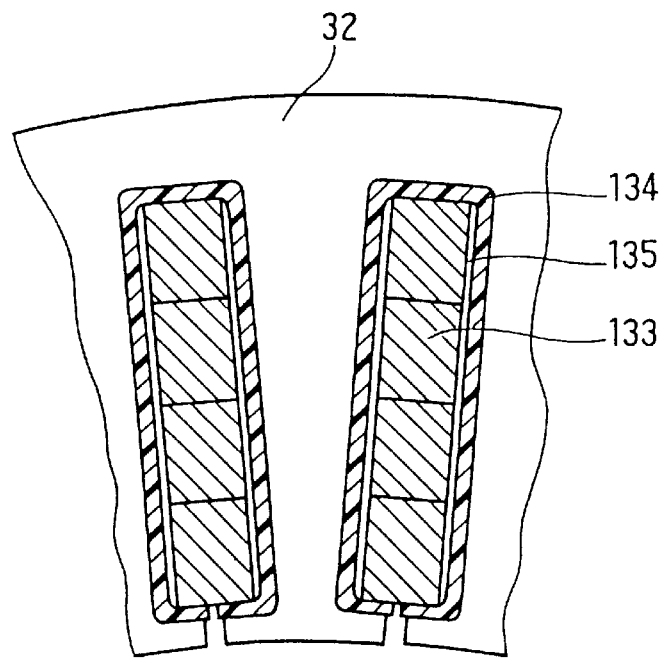
FIG. 9 is a fragmentary cross-sectional view of a variation of the stator.
Figure 10:
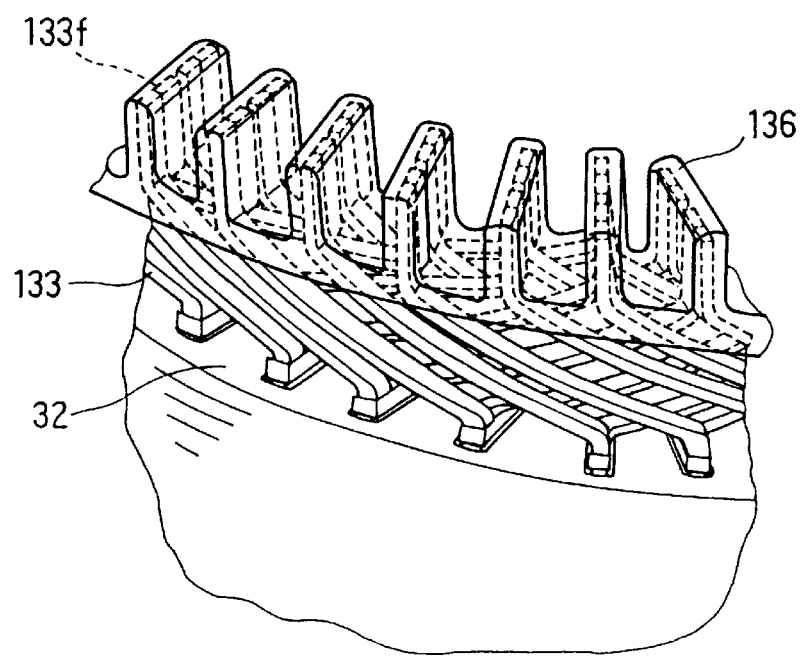
FIG. 10 is a fragmentary perspective view of the variation of the stator.

As shown in FIGS. 9 and 10, the stator winding having four conductor segments 133 each slot 135 of the stator core 32 can also provide similar annular member 136.

Figure 11:
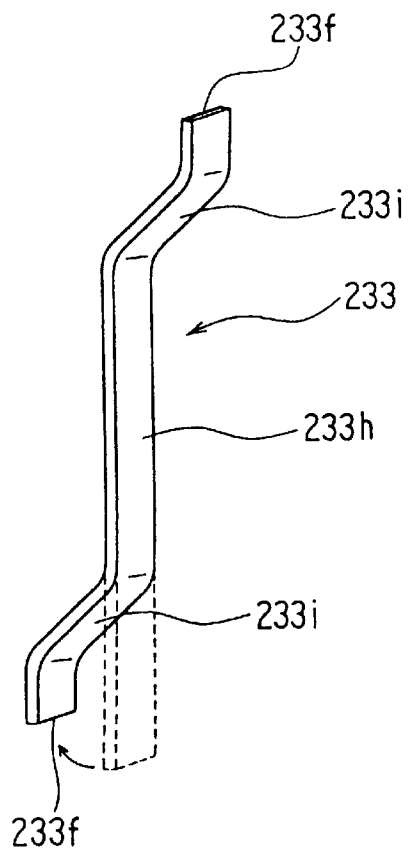
FIG. 11 is a perspective view of a conductor segment of a variation of the stator.

The conductor segments can be shaped into a shape of I or J as illustrated in FIG. 11. Conductor segments 233 is composed of in-slot portion 233h, inclined portions 233i and leading edge portions 233f. In-slot portion 233h is inserted into slot 35, the inclined portions 233i extend from both ends of the stator core 32. At least one inclined portion 233i of two is bent from the shape indicated by broken lines after the conductor segment 233 is inserted into the slot.

Figure 12:
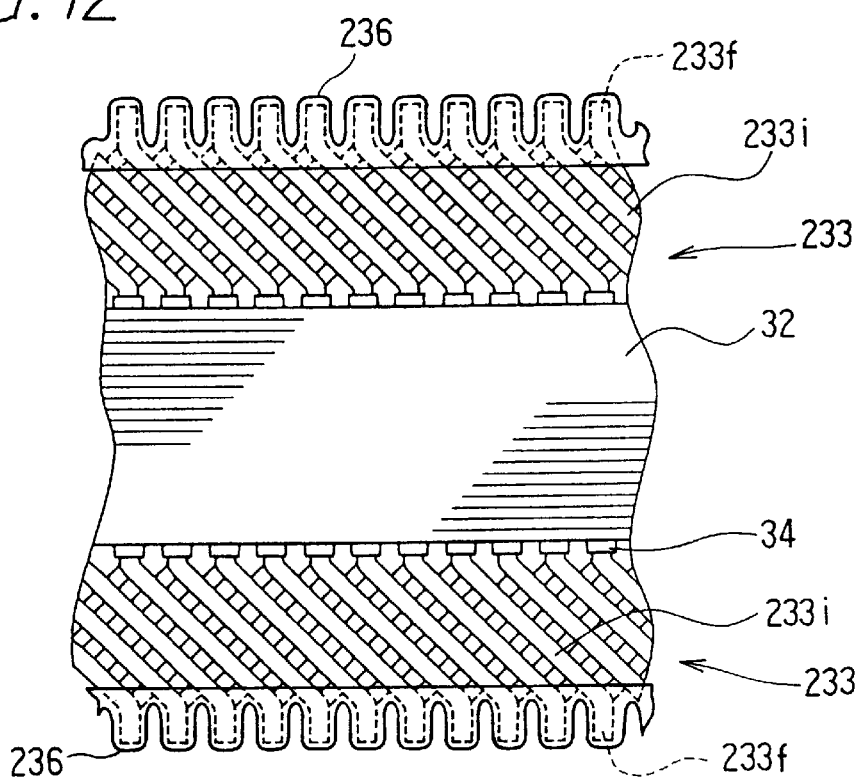
FIG. 12 is a fragmentary plan view of the variation of the stator.

As shown in FIG. 12, edge portions 233f are connected with one another and covered with the resin member 236.

The annular member (36, 136 or 236) can be separated to two or more portions. The resin member can cover wide area of inclined portions 33e if the thickness thereof is reduced, thereby maintaining spaces for cooling-air passages.

Bare conductor segments can be also used if each conductor segment is covered with insulator 34.

The connected portions are disposed only on the front or rear side of the stator core, so that the resin member 36 can be disposed only on one side of the stator core.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator for a vehicle, comprising:

a rotor;

a stator disposed around an outer periphery of said rotor; and a frame supporting said rotor and said stator, wherein said stator comprises a stator core with a plurality of slots, a plurality of conductor segments composed of coil-end portions and in-slot portions forming a stator winding, and a resin member bridging said plurality of conductor segments along a circumferential direction of said stator, wherein said plurality of conductor segments form inclined portions intersecting with one another with edge portions thereof at said coil-end portions being welded to each other, and wherein said resin member covers said edge portions and limited portions of said inclined portions, and has a thickness greater at said edge portions than at said inclined portions.

2. The alternator for vehicle as claimed in claim 1, wherein a resin layer different from said resin member also adheres to said inclined portions.

3. The alternator as claimed in claim 1, wherein each of said conductor segments comprises a resin-film coated wire having a welder-proximate portion exposed to welding pressure and heat, and wherein said resin member covers said welder-proximate portion.

4. The alternator as claimed in claim 1, wherein said resin member has a wave-shaped configuration corresponding to an outline shape of said edge portions.

5. The alternator for vehicle as claimed in claim 1, wherein said resin member is annular.

6. The alternator for vehicle as claimed in claim 1, wherein said edge portions of said conductor segments welded to each other are ball-shaped and are covered with said resin member.

7. An alternator for a vehicle, comprising:

a rotor;

a stator disposed around an outer periphery of said rotor, wherein said stator comprises a stator core with a plurality of slots and a stator winding composed of a plurality of conductor segments having in-slot portions and coil-end portions, and wherein said plurality of conductor segments include connected portions welded to one another and inclined portions adjacent thereto at said coil end portions;

a frame supporting said rotor and said stator; and a resin member covering said connected portions and limited portions of said inclined portions in a circumferential direction of said stator, said resin member being thicker at said connected portions than at said inclined portions to increase a stiffness of said coil-end portions and to protect said connected portions.

8. An alternator for a vehicle, comprising:

a rotor;

a stator disposed around an outer periphery of said rotor, wherein said stator comprises a stator core with a plurality of slots and a stator winding composed of a plurality of conductor segments having in-slot portions and coil-end portions, and wherein said plurality of conductor segments include connected portions welded to one another and inclined portions adjacent thereto at said coil end portions;

a frame supporting said rotor and said stator; and a resin member covering said connected portions and limited portions of said inclined portions, said resin member being thicker along said connected portions than said inclined portions to increase a stiffness of said coil-end portions and to protect said connected portions, wherein said conductor segments are covered with a resin layer in addition to said resin member, which is thinner than said resin member.

9. An alternator for vehicle including a rotor, a stator disposed around the outer periphery of said rotor, and a frame supporting said rotor and said stator, wherein said stator comprises a stator core with a plurality of slots, a stator winding composed of a plurality of conductor segments, and a resin member mechanically connecting said plurality of conductor segments, said plurality of conductor segments have edge portions circumferentially disposed on said coil end portions, said resin member circumferentially adheres said edge portions to bond the same in a wave-shaped configuration corresponding to surfaces of said edge portions.

10. The alternator for vehicle as claimed in claim 9, wherein said conductor segments are covered with a layer different from said resin member, and said layer is thinner than said resin member.

11. The alternator for vehicle as claimed in claim 9, wherein said coil end portions include intersecting portions intersected with each other and alignment portions aligned in the axial direction of stator core, and said resin member covers conductor segments from said alignment portions to said intersecting portions.

12. An alternator for a vehicle, comprising:

a rotor;

a stator having a plurality of slots and a stator winding; and a frame supporting said rotor and said stator, wherein said stator winding comprises a plurality of U-shaped conductor segments having connection edges connected to one another to form ring-connected coil-ends and an annular member covering said ring-connected coil-ends at said connection edges and portions of said conductor segments adjacent said connection edges, and wherein said annular member has a prescribed thickness that provides said ring-connected coil-ends with a prescribed stiffness, wherein said annular member is made of a first thermosetting resinous material having a viscosity forming said prescribed thickness when coated on said ring-connected coil ends.

13. The alternator for vehicle as claimed in claim 12, wherein said ring-connected coil-ends are impregnated with second thermosetting resinous material having a viscosity smaller than said first resinous material.

14. The alternator as claimed in claim 12, wherein said conductor segments are coated with insulation film.

15. The alternator as claimed in claim 12, wherein said connection edges have a ball-shaped end.

16. The alternator as claimed in claim 12, wherein said annular member has a wave-shaped configuration corresponding to the outline of said ring-connected coil-ends.

17. The alternator for vehicle as claimed in claim 12, wherein said ring-connected coil-ends comprise inner layer portions and outer layer portions intersecting with each other to form network structures, and said annular member covers portions of said ring-connected coil ends except said network structures.

18. The alternator for a vehicle, comprising:

a rotor;

a stator disposed around an outer periphery of said rotor; and a frame supporting said rotor and said stator, wherein said stator comprises a stator core with a plurality of slots, a plurality of conductor segments composed of coil-end portions and in-slot portions forming a stator winding, and a resin member bridging said plurality of conductor segments along a circumferential direction of said stator, wherein said plurality of conductor segments form inclined portions intersecting with one another with edge portions thereof at said coil-end portions being welded to each other, and wherein said resin member covers said edge portions and limited portions of said inclined portions, and has a thickness greater at an area of said conductor segments between said edge portions and said inclined portions than at said inclined portions.

* * * * *